(12) United States Patent
Rettner et al.

(10) Patent No.: US 6,754,017 B2
(45) Date of Patent: Jun. 22, 2004

(54) PATTERNED MEDIA MAGNETIC RECORDING DISK DRIVE WITH TIMING OF WRITE PULSES BY SENSING THE PATTERNED MEDIA

(75) Inventors: Charles T. Rettner, San Jose, CA (US); Bruce D. Terris, Sunnyvale, CA (US)

(73) Assignee: Hitachi Global Storage Technologies, Netherlands B.V., Amsterdam (NL)

(*) Notice: Subject to any disclaimer, the term of this patent is extended or adjusted under 35 U.S.C. 154(b) by 275 days.

(21) Appl. No.: 10/033,002

(22) Filed: Oct. 26, 2001

(65) Prior Publication Data

US 2003/0107833 A1 Jun. 12, 2003

(51) Int. Cl.$^7$ ................................................ G11B 5/09
(52) U.S. Cl. .................................... 360/51; 360/31
(58) Field of Search ............................. 360/51, 31, 68, 360/48, 46, 39, 40, 230, 234, 313, 317, 318, 119, 122

(56) References Cited

U.S. PATENT DOCUMENTS

| | | |
|---|---|---|
| 4,823,205 A | 4/1989 | Hannon et al. |
| 4,912,585 A | 3/1990 | Belser et al. |
| 5,455,730 A | 10/1995 | Dovek et al. |
| 5,820,769 A | 10/1998 | Chou |
| 5,999,360 A | 12/1999 | Meyer et al. |
| 6,104,562 A | 8/2000 | Ottesen et al. |

OTHER PUBLICATIONS

H. Yada et al., *External Clocking PRML Magnetic Recording Channel for Discrete Track Media*, IEICE Trans. Fundamentals, vol. E76–A, No. 7, Jul. 1993, pp. 1164–1166.
R. L. White et al., *Patterned Media: A Viable Route to 50 Gbit/in2 and Up for Magnetic Recording?*, IEEE Transactions on Magnetics, vol. 33, No. 1, Jan. 1997, pp. 990–995.
M. Dwortzan, *"Patterned" Media Could Squeeze More Data Into Smaller Packages*, Metals and Magnetic Materials, MPC Industry Collegium Report, vol. 16, No. 1, Apr. 1999, pp. 3–4.
J. Zhu et al., *Recording, Noise, and Servo Characteristics of Patterned Thin Film Media*, IEEE Transactions on Magnetics, vol. 36, No. 1, Jan. 2000, pp. 23–29.
X. Lin et al., *Spin Stand Study of Density Dependence of Switching Proprieties in Patterned Media*, IEEE Transactions on Magnetics, vol. 36, No. 5, Sep. 2000, pp. 2999–3001.
J. Lohau et al., *Writing and Reading Perpendicular Magnetic Recording Media Patterned by a Focused Ion Beam*, Applied Physics Letters, vol. 78, No. 7, Feb. 12, 2001, pp. 990–992.
K. J. Kirk et al., *Magnetic Nano–Elements for Ultrahigh Density Storage*, Datatech, Ed. 3, 1999, pp. 87–91 Online. Journal at: http://www.semiconductorfabtech.com/datatech/journals/edition3/download/dt3–4_2.pdf.

*Primary Examiner*—Alan T. Faber
(74) *Attorney, Agent, or Firm*—Thomas R. Berthold

(57) ABSTRACT

A magnetic recording disk drive with patterned disk media, wherein discrete magnetic data blocks representative of the individual data bits are isolated from one another, uses the discrete data blocks as the source of the clocking signal to the write head. The carrier for the read/write head includes a special pattern sensor that senses the data blocks in the data tracks before they pass beneath the write head. The pattern sensor output serves as the clocking signal to precisely control the placement of the write pulses by the write head. A time delay is calculated using a timing mark on the patterned disk to delay the write pulses so that a data block sensed by the pattern sensor is the same data block to which the write pulse is applied. In this manner the actual previously recorded data provides the synchronization or clocking signal to control the writing of the new data. The time delay is calculated from measurement of the time for a timing mark to pass from the pattern sensor to the read head and from known spacings of the pattern sensor, read head and write head on the head carrier.

16 Claims, 4 Drawing Sheets

PATTERNED MEDIA MAGNETIC RECORDING DISK DRIVE WITH TIMING OF WRITE PULSES BY SENSING THE PATTERNED MEDIA

TECHNICAL FIELD

This invention relates to magnetic recording disk drives for use with patterned media, wherein each data bit is stored in a magnetically isolated block on the disk.

BACKGROUND OF THE INVENTION

Conventional magnetic recording disks are made with a continuous magnetic layer that is deposited on an aluminum alloy or glass substrate coated with a nickel-phosphorus layer (referred to hereafter as continuous magnetic disk media). The magnetic materials, or media, are generally cobalt, nickel and/or iron alloys deposited by evaporation or sputtering to form the continuous magnetic layer. In such media, each magnetic bit consists of several hundred small grains of the magnetic alloy material. One approach to increasing the bit density for conventional continuous magnetic disk media is to reduce the grain sizes along with the bit sizes while keeping the total number of grains per bit approximately constant. This approach is limited because very small grains may switch magnetization direction spontaneously at normal operating temperatures because their magnetic energy is comparable with that available thermally. The alternative approach of reducing the number of grains per bit leads to poor recording performance due to an increase in the noise arising from statistical fluctuations in grain positions or orientation.

The use of patterned magnetic disk media is one approach to overcome the problems associated with increasing bit densities by reducing grains size. Increasing bit densities of magnetic recording media can be achieved by patterning the magnetic material into small isolated islands or blocks such that there is a single magnetic domain in each block or "bit". The single magnetic domains can be a single grain or consist of a few strongly coupled grains that switch magnetic states in concert as a single magnetic volume. With only a single magnetic volume per block, noise fluctuations arising from grain positions or orientation are eliminated. To produce the required magnetic isolation of the patterned blocks, the magnetic moment of the regions between the blocks must be destroyed or substantially reduced so as to render these regions essentially nonmagnetic. Alternatively, the media may be fabricated so that that there is no magnetic material in the regions between the blocks. U.S. Pat. No. 5,820,769 is representative of various types of patterned media and their methods of fabrication. A description of magnetic recording systems with patterned media and their associated challenges is presented by R. L. White et al., "Patterned Media: A Viable Route to 50 Gbit/in$^2$ and Up for Magnetic Recording?", *IEEE Transactions on Magnetics*, Vol. 33, No. 1, January 1997, 990–995.

In conventional magnetic recording where the data bits are written on continuous media, there is no requirement to write to precise positions on the media since all of the media contains magnetic material. However, to write on patterned media using the conventional unsynchronized approach, the media must be patterned perfectly with a single accurate period, and the effective motor speed of the spindle supporting the disks must be highly stable. Together, the accuracy of the media patterning and the stability of the spindle speed has to be such that bits could be written over distances up to 1 mm with positioning accuracy of the bits to about 10 nm. In the White et al. article it is suggested that the conventional read/write head could not be modified to allow reading of synchronization or clocking marks by the read head while writing occurs by the write head because of the significant coupling between the read and write signals.

Prior to the interest in patterned media, patterned "discrete track" media was proposed, as described in IBM's U.S. Pat. No. 4,912,585. In this type of media, each data track consists of continuous media, like the conventional media, but the individual data tracks are separated by nonmagnetic guard bands. In addition, special marks, such as servo positioning marks and synchronization marks indicating the beginning of a data block, are formed as discrete magnetic blocks separated by nonmagnetic regions. The reading of synchronization or clocking marks by the read head of a conventional read/write (R/W) head in a magnetic recording system that used discrete tracks of continuous media separated by nonmagnetic guard bands has been demonstrated by H. Yada, et al., "External Clocking PRML Magnetic Recording Channel for Discrete Track Media", *IEEE Trans. Fundamentals*, Vol. E76-A, No. 7, July 1993, 1164–1166. In that system, the clocking marks were read from discrete magnetized regions in servo/clocking sectors spaced along the tracks, with the user data being written in the continuous magnetic media located between the servo/clocking sectors.

What is needed is magnetic recording system for patterned media that compensates for imperfect patterning of the media by modifying the timing of the write pulses.

SUMMARY OF THE INVENTION

The invention is a magnetic recording disk drive that uses patterned disk media wherein discrete magnetic data blocks representative of the individual data bits are isolated from one another. The carrier for the read/write head includes a special pattern sensor that senses the data blocks in the data tracks before they pass beneath the write head. The pattern sensor output serves as the clocking signal to precisely control the placement of the write pulses by the write head. A time delay is calculated using a timing mark on the patterned disk to delay the write pulses so that a data block sensed by the pattern sensor is the same data block to which the write pulse is applied. In this manner the actual previously recorded data provides the synchronization or clocking signal to control the writing of the new data. The time delay is calculated from measurement of the time for a timing mark to pass from the pattern sensor to the read head and from known spacings of the pattern sensor, read head and write head on the head carrier. The pattern sensor may be a magnetoresistive-type sensor, a capacitive sensor that senses capacitive contrast between the data blocks and the nonmagnetic regions, or a thermal sensor that senses variations in thermal conductivity between the data blocks and the nonmagnetic regions.

For a fuller understanding of the nature and advantages of the present invention, reference should be made to the following detailed description taken together with the accompanying figures.

DETAILED DESCRIPTION OF THE INVENTION

Figure 1:
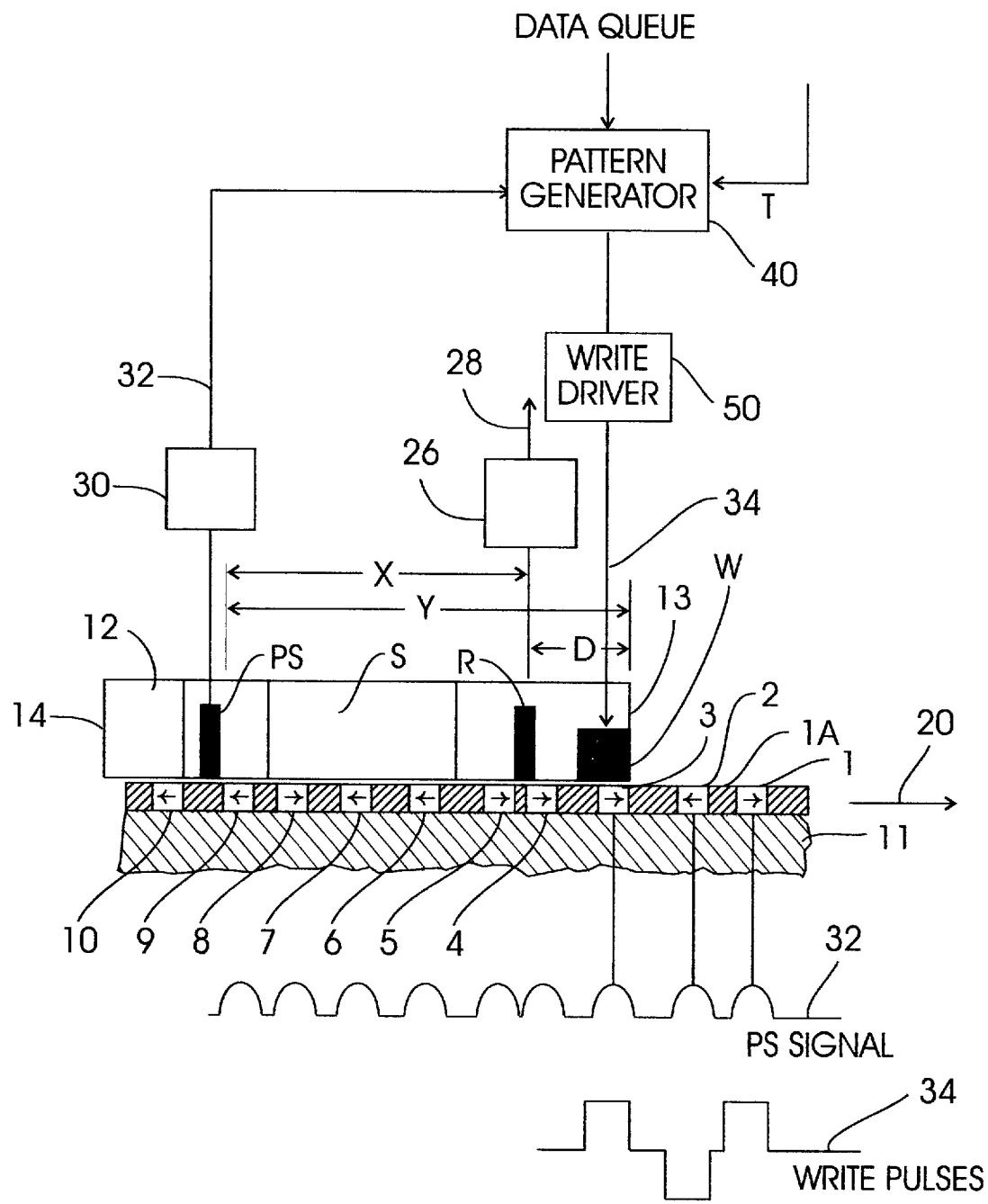
FIG. 1 is a schematic of a magnetic recording system of the present invention illustrating a side sectional view of an air-bearing slider with a R/W head and a pattern sensor, and a disk with a single track of blocks of patterned media.

FIG. 1 shows a sectional view of a magnetic recording disk 11 with a magnetic recording layer of patterned media in the form of discrete blocks 1–10 of magnetic material, and an air-bearing slider 12 with a conventional R/W head located near its trailing end 13 and a pattern sensor (PS) near its leading end 14. The slider 12 serves as the carrier for the R/W head and is supported on an actuator that moves the carrier in a generally radial direction across the disk so the R/W head can access the different data tracks as the disk 11 rotates. The blocks 1–10 of magnetic material on the disk 11 are aligned along a data track and are spaced apart by nonmagnetic regions, such as region 1A between blocks 1 and 2. The term "nonmagnetic" means that the regions between the blocks are formed of a nonferromagnetic material, such as a dielectric, or a material that has no substantially remanent moment in the absence of an applied magnetic field. The arrows depicted in the blocks 1–10 represent the magnetic moments or magnetization directions in the blocks. In a disk drive the data tracks are circular and concentric. As shown in FIG. 1, the blocks are illustrated as being somewhat unevenly spaced along the data track to represent the imperfect patterning that can occur during fabrication. While it is common to refer to each block as storing a data "bit", it is actually the transition between the magnetization directions in successive data blocks that represent a data bit in the data channel of the disk drive. These transitions are detectable by the conventional magnetoresistive read head R. The recording or writing of data occurs by the conventional thin film inductive coil write head W that generates a magnetic field to magnetize the blocks in one of the two magnetization directions, depending on the direction of current through the coil of the write head W. Because there is no magnetic material between the blocks 1–10, the write pulses must be precisely timed to magnetize the appropriate blocks. While FIG. 1 illustrates horizontal or longitudinal patterned media, wherein the blocks 1–10 are depicted with their moments in the plane of the recording layer, the invention is fully applicable to perpendicular patterned media, wherein the blocks 1–10 would have their moments oriented into and out of the plane of the recording layer.

Arrow 20 shows the direction of media travel, so that block 1, for example, passes under pattern sensor PS before it passes under read head R and write head W. As the sensor PS senses the magnetized blocks, block detection circuitry 30 generates a signal 32. Similarly read head R is connected to read detection circuitry 26 that generates a signal 28. The data to be written to the disk is sent from the host processor to the write channel of the disk drive and directed as the data queue to pattern generator 40. The signal from sensor PS is used as the clocking signal to pattern generator 40. A time delay T, which is proportional to the time t1 between sensing of a data block by the pattern sensor PS and the read head R as a result of their physical spacing X on the slider 12, is applied to the clocking signal to pattern generator 40 to correct the timing of the pulses by the conventional write driver 50. This assures that the pulses from write driver 50 energize the coil of the write head W just as the blocks pass under it, resulting in the correctly timed write signal 34. In this manner the actual data in the tracks, in the form of the successive blocks of the patterned media, serve as the clock source for timing the writing of data.

Figure 2:
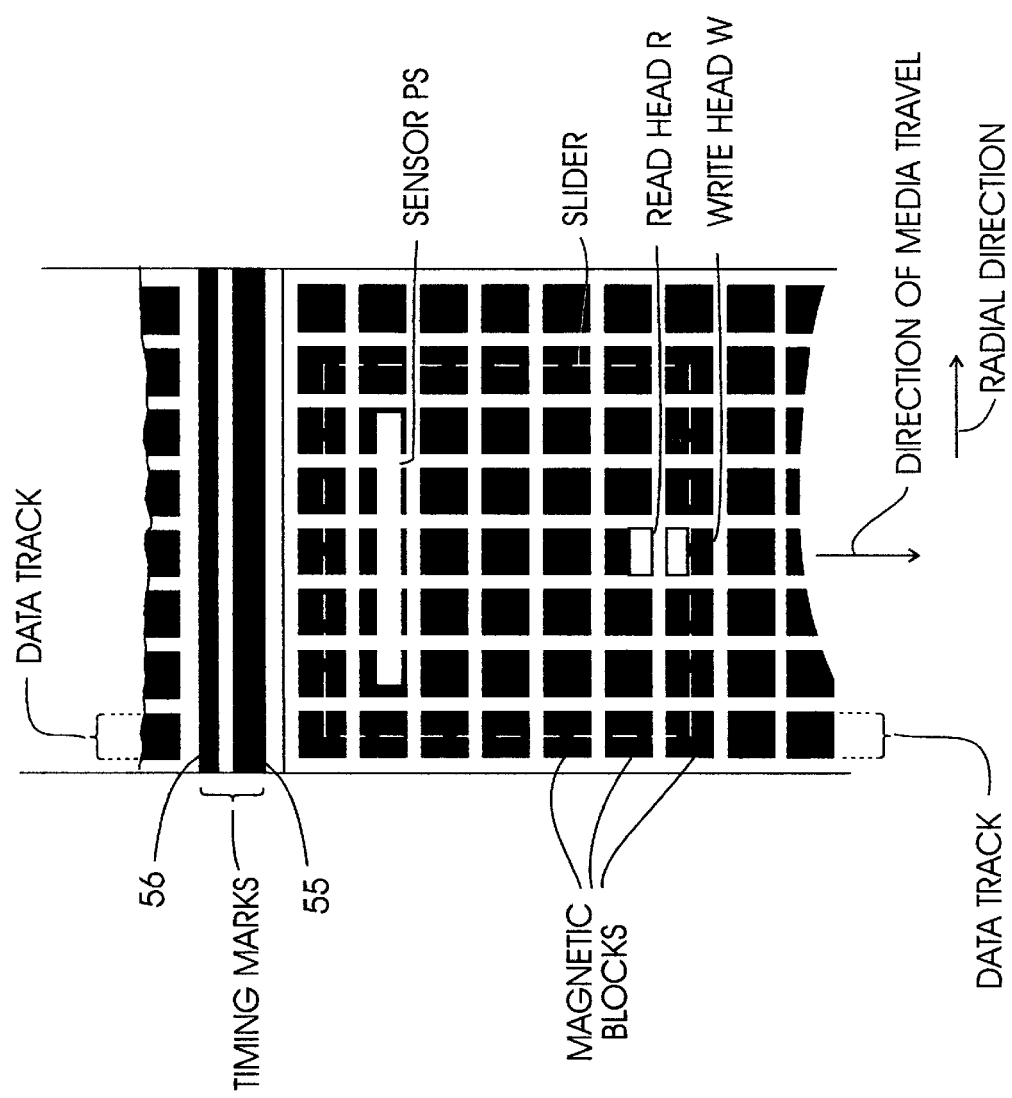
FIG. 2 is a schematic top view of the patterned disk media illustrating a pattern sensor on the slider extending across four data tracks and timing marks extending across the data tracks.

The sensor PS has a width such that it detects only the blocks in a single track, preferably the track to which data is being written. However, the sensor PS may be designed to have a width that spans at least two data tracks. This is depicted in the top view of FIG. 2, which shows the sensor PS extending across at least three tracks to increase the strength of the sensed signal and therefore its accuracy.

In one embodiment, the sensor PS is a magnetoresistive (MR) sensor separated from read head R by a shield S, as shown in FIG. 1. The slider 12 with MR sensor PS is fabricated in substantially the same manner as sliders with conventional R/W heads except that additional conventional thin film processing steps is required to pattern the films making up shield S and sensor PS with its electrical leads. A slider with a second MR sensor for sensing an embedded servo pattern in a disk with continuous magnetic media is described in IBM's U.S. Pat. No. 6,104,562.

The operation of the disk drive with a MR pattern sensor, in particular the operation of the pattern sensor clocking signal together with the time delay, will now be explained with respect to FIG. 3. In addition to the data blocks the disk also contains isolated timing marks for use in generating the delay signal T. These marks generate a specific unique pulse sequence different from the pulses generated by the data blocks. They may be specially formed just for the timing delay measurement or may be special marks used for other purposes, such as index marks, servo timing marks or data field preamble marks, all of which are used in conventional continuous magnetic media as permanently recorded marks that cannot be erased during normal operation of the disk drive. In the case of patterned media the index marks are magnetic stripes that extend across the radius of the disk, and are used to indicate the beginning of the data tracks. Index type marks usable as the timing marks are shown as radial stripes 55, 56 in FIG. 2. The previously cited '585 patent illustrates discrete magnetic regions used as servo timing marks.

Prior to writing, the write head W is used to DC magnetize the region where data will be written. This makes all of the patterned data blocks and all of the special marks, including the timing marks, magnetized in the same direction. The timing marks 55, 56 are used to measure the time lapse between the output from the two sensors, PS and R. As shown in FIG. 3, the signal from sensor PS is amplified by preamplifier 60. Following the relatively long pulse from mark 55, the leading edge of the pulse from the following mark 56 is detected using a discriminator 61, or alternatively a threshold detector. The output from discriminator 61 is used to trigger the start of timer 80, such as a quartz crystal oscillator. When the marks 55, 56 subsequently pass under sensor R, the signal is processed by preamplifier 70 and discriminator 71 in a similar manner and the output of discriminator 71 stops timer 80. The time measurement output by timer 80 is t1, the time between detection of the leading edge of the pulse from the same timing mark 56 by sensor PS and sensor R. The required delay T is derived from t1 and the known spacings between W, R, and PS. These spacings are measured by known techniques, such as scanning electron microscopy, during slider manufacturing, and stored in the delay generator 82. The time delay T required between detection of a data block by sensor PS and the write pulse from write head W to record that data block will be greater than t1 by the product of the ratio of the spacing between PS and R (which is X in FIG. 1) and the spacing between PS and W (which is Y in FIG. 1). Thus, T=t1(Y/X). Because the spacing D between R and W is also well known because of the precision in manufacturing conventional R/W heads, particularly merged heads wherein the R and W elements share a common shield, the value of Y is also X+D. In operation of the disk drive, the value t1 and thus the delay T can be re-calculated by detecting the timing marks with each disk rotation, or each time the R/W head is moved to a new track. Alternatively, following power-on of the disk drive, and/or at regular intervals thereafter, an initialization sequence can be performed to calculate the value of T for each track. These values can be stored in memory and a table look-up used to recall the appropriate value of T during read and write operations.

To write the data queue received by pattern generator 40, the signal from discriminator 61 connected to sensor PS is also sent to pattern generator 40 and is used as the clocking signal to trigger the pattern generator 40 for each block detected. Thus the actual data blocks detected by sensor PS are used as the clock to clock the data queue output by pattern generator 40. Assuming the DC magnetized track contains all 0's, then it is only necessary to write 1's. If a 0 is to be written. then no pulse is output by pattern generator 40 to write driver 50. If a 1 is to be written, then a write pulse is generated, but is delayed by time T. In this manner, the write driver 50 will pulse the write head W just as the desired block to be written passes under it.

Figure 3:
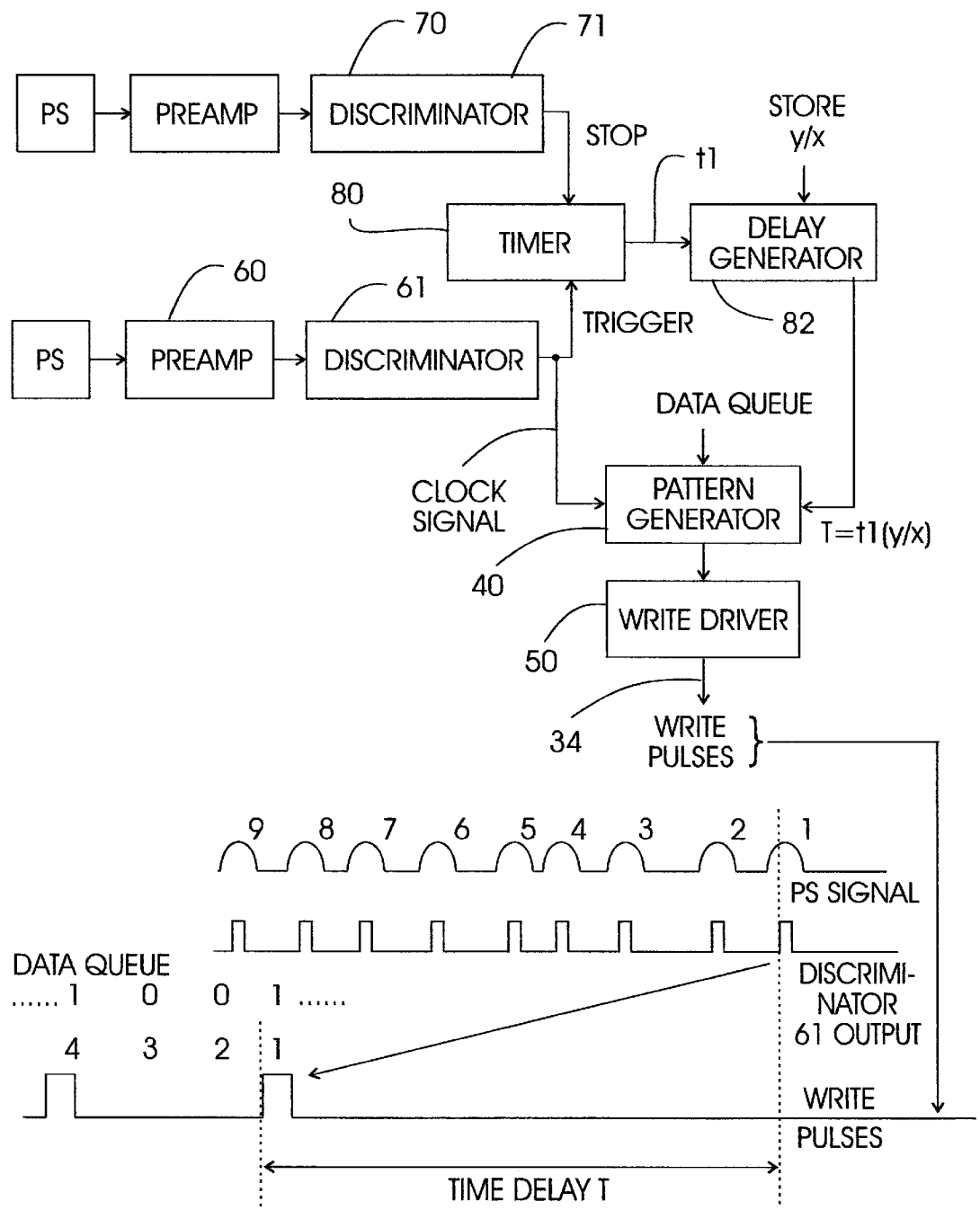
FIG. 3 is a block level diagram illustrating the operation of the signal detection and clocking for a magnetoresistive (MR) pattern sensor and using a DC magnetized patterned disk.
Figure 4:
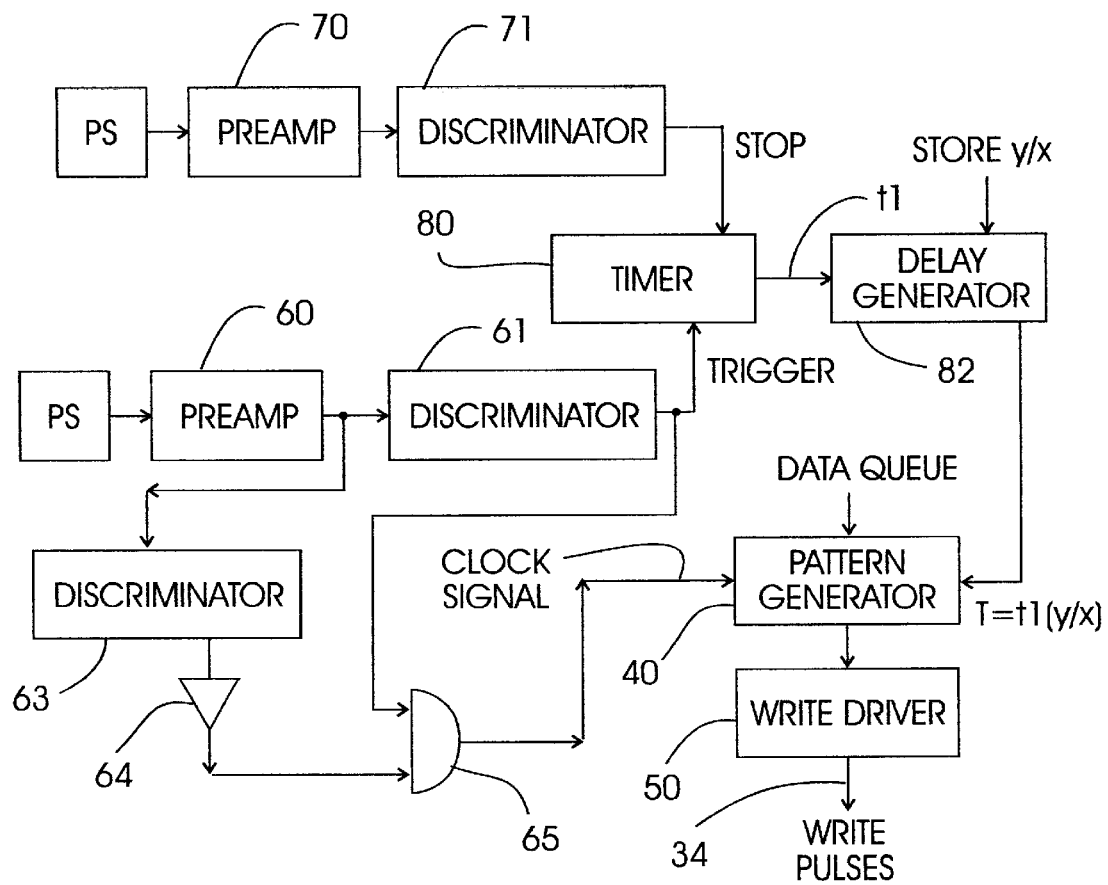
FIG. 4 is a block level diagram illustrating the operation of the signal detection and clocking for a magnetoresistive (MR) pattern sensor with two discriminators and a signal inverter and using a patterned disk having data blocks magnetized in any one of two directions.
Figure 4:
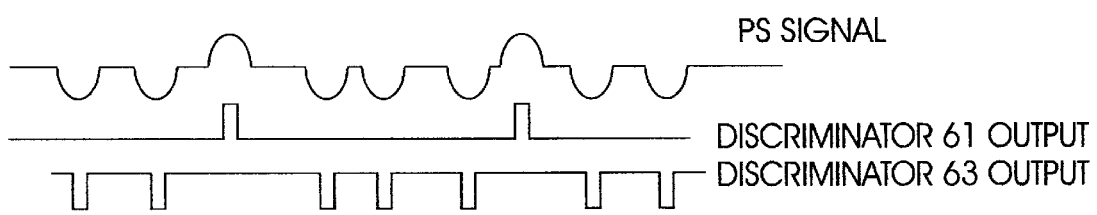

The above description of FIG. 3 describes the writing method when the data track has been previously DC magnetized. This method requires two passes under the write head, one to DC magnetize the region where data is to be written and one to write the data. A different method omits the DC magnetization step and allows the new data to be recorded directly over previously recorded data. Thus FIG. 4 illustrates the operation of a disk drive according to the present invention where the data queue to be written is clocked by the data blocks when the data track has not been previously DC magnetized. The time delay T is determined as described previously. To determine the locations of the blocks, which can be magnetized in one or the other direction depending on whether a 0 or a 1 has been previously recorded, the polarities of all blocks are detected. As shown in FIG. 4, a second discriminator 63 connected to the sensor PS detects negative pulses. The output of discriminator 63 is inverted by inverter 64 and sent to OR gate 65, which also receives the positive pulses from discriminator 61. Thus the clock to pattern generator 40 is the output from all data blocks, regardless of the direction in which they are magnetized.

Other types of sensors, in place of the MR pattern sensor, can be used to sense the blocks of patterned media in the data tracks. For example, a capacitive sensor, such as that described in IBM's U.S. Pat. No. 4,823,205, can be used to detect the blocks. The metal lead of the capacitive sensor can be located either in-line (i.e., along the same track) as the read head R or cross track from it. The capacitive contrast required by the capacitive sensor can be provided either from topography differences, conductivity differences or spatially varying dielectric constant differences on the disk. In the case of topography, the patterned blocks are located closer to the head than nonmagnetic trenches surrounding the blocks. Since the sensor-to-disk capacitance varies inversely with distance, the capacitive signal will increase when the capacitive sensor is above an block and decrease when it is above a trench. If the capacitive sensor is designed to have a width that spans multiple tracks, as shown by the pattern sensor in FIG. 2, the averaged signal will likewise increase as a row of blocks passes under the sensor. Alternatively, if the blocks are metallic, as are most magnetic metal alloy recording materials, and the spaces between them insulating, such as regions of a bare glass disk, capacitive contrast will likewise be generated. Such a patterned media would result from a subtractive process, where a full media film is deposited and then selected areas to serve as the nonmagnetic regions are removed via an etch process to leave the isolated magnetic blocks. The detection circuitry for a disk drive that uses a capacitive sensor is similar to that shown in FIG. 3. The capacitive-type PS sensor will detect an increase in sensor-disk capacitance as it passes over a block due to the reduced head-disk spacing. This pulse is then amplified and detected with a discriminator as shown in FIG. 3.

Another type of pattern sensor that can detect the media blocks in the data tracks ahead of the R/W head is a thermal sensor. This sensor can be a MR film, or any metallic film with a temperature dependent resistivity, to detect sensor-disk spacing variations which have been correlated to cooling of the MR film by dissipation of heat from the MR film to the disk, a discovery which is described in IBM's U.S. Pat. No. 5,455,730. This discovery has led to proposed use of a MR thermal sensor, together with a pattern of contour elements on the disk, to provide track following servo positioning information for the R/W head in a disk drive. This is described in U.S. Pat. No. 5,999,360 assigned to Seagate Technology Inc., wherein the contour elements have a height such that the spacing between the MR thermal sensor and the contour elements is different from the spacing between the MR sensor and the nominal surface of the disk. The thermal type pattern sensor is operated by applying a constant current and detecting the voltage drop across it. Since V=IR, a change in resistance, resulting from a change in temperature, will give rise to a voltage change. For the case of topographic media blocks, the tops of the blocks are closer to the thermal sensor than the trenches around the blocks, resulting in a greater heat flow away from the thermal sensor when it is over a media block. Thus, the temperature of the thermal sensor will drop as a media block passes under it. Similarly, if the media blocks are formed of a material with a different thermal conductivity than the surrounding material, the temperature of the thermal sensor will vary as the blocks pass beneath it, even if there is no physical height variation between the media blocks and the surrounding material. For example, in the patterned media disk of the type fabricated by etching a magnetic film, the metallic blocks would have a greater thermal conductivity than the surrounding glass disk, resulting in a lower temperature of the thermal sensor when the blocks pass beneath it. The detection circuit is similar to that shown in FIG. 3. The thermal sensor will detect a decrease in the sensor resistance when a block passes beneath it due to the increased head cooling from the smaller head-disk spacing. This pulse is then amplified and detected with a discriminator as shown in FIG. 3. The advantage of both a capacitive sensor and a thermal sensor is that the signal output is substantially identical for all data blocks, unlike the MR type pattern sensor whose output has a polarity dependent on the direction of magnetization of the data blocks.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a rotatable patterned magnetic recording disk having a plurality of generally circular data tracks, each track patterned into discrete data blocks of magnetic material separated by nonmagnetic regions, each block being magnetizable to represent data bits;
   a head carrier maintained in close proximity to the disk and having a read head for detecting magnetized data blocks and a write head for magnetizing the data blocks, the carrier being movable in a generally radial direction across the surface of the rotatable disk to permit the read and write heads to access different data tracks; and
   a data block pattern sensor located on the carrier for sensing the data blocks in a data track before the data blocks are written by the write head; whereby a data block is magnetized by the write head a predetermined delay time after the data block to be magnetized has been sensed by the pattern sensor.

2. The disk drive of claim 1 further comprising:
   a write driver coupled to the write head for generating write pulses to the write head;
   a pattern generator for generating a pattern of write signals to the write driver, the pattern generator being coupled to the pattern sensor and receiving signals from the pattern sensor for clocking the write signals to the write driver; and
   wherein the clocking signals are delayed by said delay time corresponding to the time for a data block to pass from the pattern sensor to the write head.

3. The disk drive of claim 2 wherein the disk includes a timing mark and further comprising a timer triggered by a signal indicating sensing of the timing mark by the pattern sensor and stopped by a signal indicating detection of the timing mark by the read head.

4. The disk drive of claim 3 further comprising a delay generator coupled to the pattern generator and the timer for calculating said delay time from a value representative of the spacing between the pattern sensor and the write head and the output of the timer.

5. The disk drive of claim 1 wherein the pattern sensor comprises a magnetoresistive sensor whose signal output has a polarity representative of the direction of magnetization of the data block being sensed.

6. The disk drive of claim 5 further comprising an inverter connected to the magnetoresistive pattern sensor for inverting all signal outputs of the same polarity.

7. The disk drive of claim 1 wherein the pattern sensor comprises a capacitive sensor.

8. The disk drive of claim 1 wherein the pattern sensor comprises a thermal sensor.

9. The disk drive of claim 1 wherein the pattern sensor has a width in the disk radial direction that spans at least two data tracks.

10. The disk drive of claim 1 wherein the head carrier is an air-bearing slider, wherein the read head is a magnetoresistive read and wherein the write head is a thin film inductive coil write head.

11. A magnetic recording disk drive comprising:
    a rotatable patterned magnetic recording disk having a plurality of concentric data tracks, each track patterned into discrete data blocks of magnetic material separated by nonmagnetic regions, the disk also having a timing mark;
    a head carrier maintained in close proximity to the disk and having a magnetoresistive read head for reading the data blocks and an inductive coil write head for generating a magnetic field to magnetize and thereby write the data blocks, the carrier being movable in a generally radial direction across the surface of the rotatable disk to permit the read and write heads to access different data tracks;
    a data block pattern sensor located at a position on the carrier whereby the data blocks in a track are sensed by the pattern sensor before they are detected by the read head, the pattern sensor generating a clocking signal as the data blocks are sensed;
    a write driver responsive to a data queue representing the data to be written on the disk and to the clocking signal from the pattern sensor for sending write pulses to the coil of the write head for writing the data blocks;
    a timer triggered by a signal indicating sensing of the timing mark by the pattern sensor and stopped by a signal indicating detection of the timing mark by the read head; and
    a delay generator for calculating a delay time from the time measured by the timer and from the spacing on the carrier between the pattern sensor and the write head, the delay time modifying the clocking signal from the pattern sensor and thereby the timing of the write pulses; whereby the magnetic fields from the coil of the write head are directed to the data blocks to be written.

12. The disk drive of claim 11 wherein the calculated delay time is the product of the time measured by the timer and the ratio of the spacing on the carrier between the pattern sensor and the write head to the spacing on the carrier between the pattern sensor and the read head.

13. The disk drive of claim 11 wherein the pattern sensor comprises a magnetoresistive sensor whose signal output has a polarity representative of the direction of magnetization of the data block being sensed, and further comprising an inverter connected to the magnetoresistive pattern sensor for inverting all signal outputs of the same polarity.

14. The disk drive of claim 11 wherein the pattern sensor comprises a capacitive sensor for sensing the capacitive contrast between data blocks and nonmagnetic regions.

15. The disk drive of claim 11 wherein the pattern sensor comprises a thermal sensor for sensing thermal conductivity differences between data blocks and nonmagnetic regions.

16. The disk drive of claim 11 wherein the pattern sensor has a width in the disk radial direction that spans at least two data tracks.

* * * * *